(12) United States Patent
Lundby et al.

(10) Patent No.: US 11,333,274 B2
(45) Date of Patent: May 17, 2022

(54) HOSE CONNECTOR ASSEMBLY

(71) Applicant: KA Group AG, Zürich (CH)

(72) Inventors: Odvar William Lundby, Hunndalen (NO); Kjell Villanger, Raufoss (NO); John Magnus Daehlin, Gjøvik (NO); Jens Mühlmeister, Haan (DE)

(73) Assignee: KA Group AG, Zürich (CH)

( * ) Notice: Subject to any disclaimer, the term of this patent is extended or adjusted under 35 U.S.C. 154(b) by 72 days.

(21) Appl. No.: 16/760,692

(22) PCT Filed: Nov. 16, 2017

(86) PCT No.: PCT/EP2017/079422
§ 371 (c)(1),
(2) Date: Apr. 30, 2020

(87) PCT Pub. No.: WO2019/096385
PCT Pub. Date: May 23, 2019

(65) Prior Publication Data
US 2020/0309297 A1  Oct. 1, 2020

(51) Int. Cl.
*F16L 19/00* (2006.01)
*F16L 33/035* (2006.01)
*F16L 33/18* (2006.01)

(52) U.S. Cl.
CPC ........... *F16L 19/005* (2013.01); *F16L 33/035* (2013.01); *F16L 33/18* (2013.01)

(58) Field of Classification Search
CPC ....... F16L 33/223; F16L 33/24; F16L 33/035; F16L 19/005; F15L 37/0925
See application file for complete search history.

(56) References Cited

U.S. PATENT DOCUMENTS 5,269,566 A * 12/1993 Do .......................... F16L 19/005
                                                          285/220
5,348,349 A *  9/1994 Sloane .................. F16L 19/005
                                                           285/86
(Continued)

FOREIGN PATENT DOCUMENTS

GB  2331340 A    5/1999
JP  H0368695 U   7/1991
(Continued)

OTHER PUBLICATIONS

International Search Report for Application No. PCT/EP2017/079422 dated Jun. 13, 2018, 3 pages.

*Primary Examiner* — Zachary T Dragicevich
(74) *Attorney, Agent, or Firm* — Howard & Howard Attorneys PLLC

(57) ABSTRACT

A hose connector assembly for connecting a hose to a port of a pressurized fluid system, the system including a socket and an adapter tube in fluid communication, with an end portion of the socket adapted to be connected to a port and having a receiving opening. The adapter tube has a plug-in end portion to be pushed into the receiving opening which is adapted to cooperate with the plug-in end portion to form a plug-in connection mechanism. The adapter tube has a hose connector end fitting adapted to be received in, hold and retain a hose end portion. Complementary locking surfaces of the receiving opening and plug-in end portion are engaged when the plug-in end portion is connected by the plug-in connection mechanism to the socket to lock the adapter tube with respect to the socket against rotation about the longitudinal axis of the adapter tube within the socket.

14 Claims, 9 Drawing Sheets

(56) References Cited

U.S. PATENT DOCUMENTS

Figure 1A:
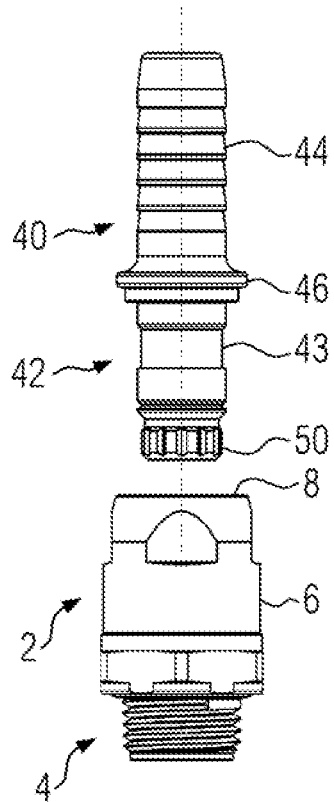

| | | |
|---|---|---|
| 2003/0057699 A1 | 3/2003 | Persohn et al. |
| 2007/0164566 A1* | 7/2007 | Patel ..................... F16L 19/005 285/386 |
| 2011/0036081 A1* | 2/2011 | Lechner .............. F16L 37/0925 285/80 |

FOREIGN PATENT DOCUMENTS

| | | |
|---|---|---|
| WO | 9713094 A1 | 4/1997 |
| WO | 02066880 A1 | 8/2002 |
| WO | 02073077 A1 | 9/2002 |
| WO | 2009068932 A1 | 6/2009 |
| WO | 2009068934 A1 | 6/2009 |

* cited by examiner

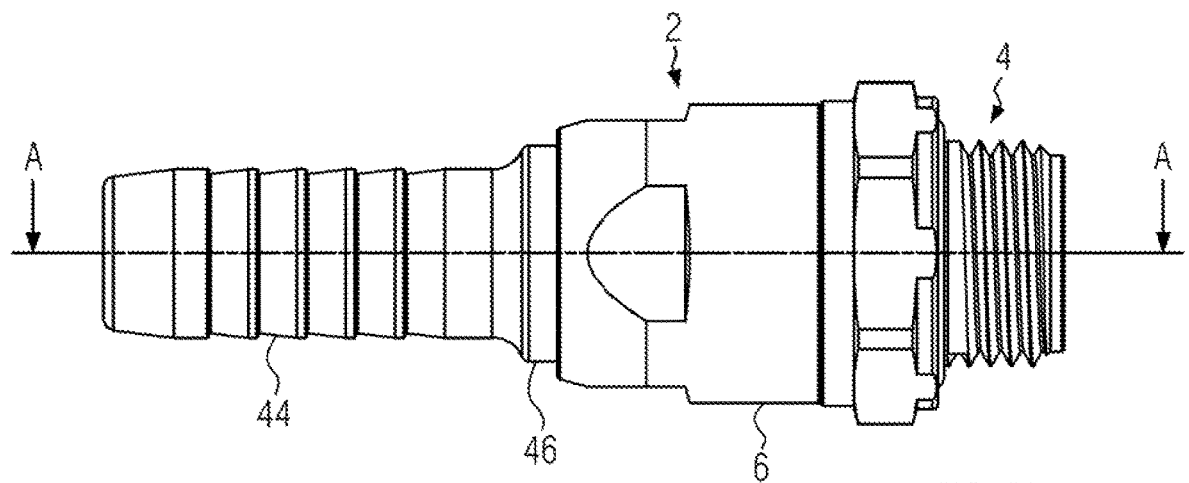
FIG. 5A
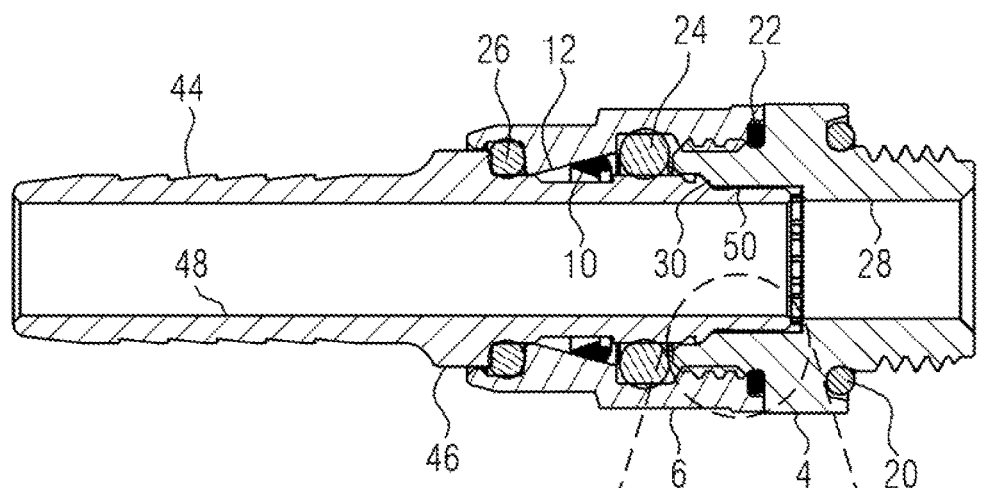
FIG. 5B
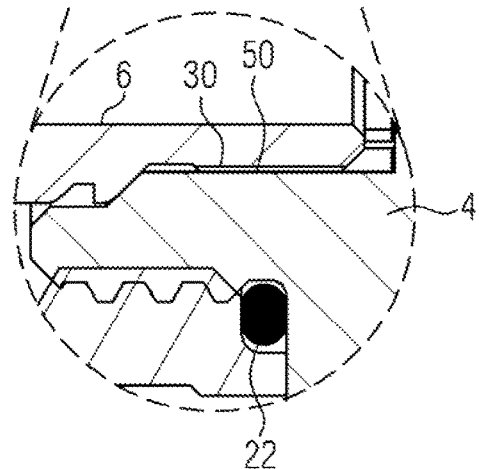

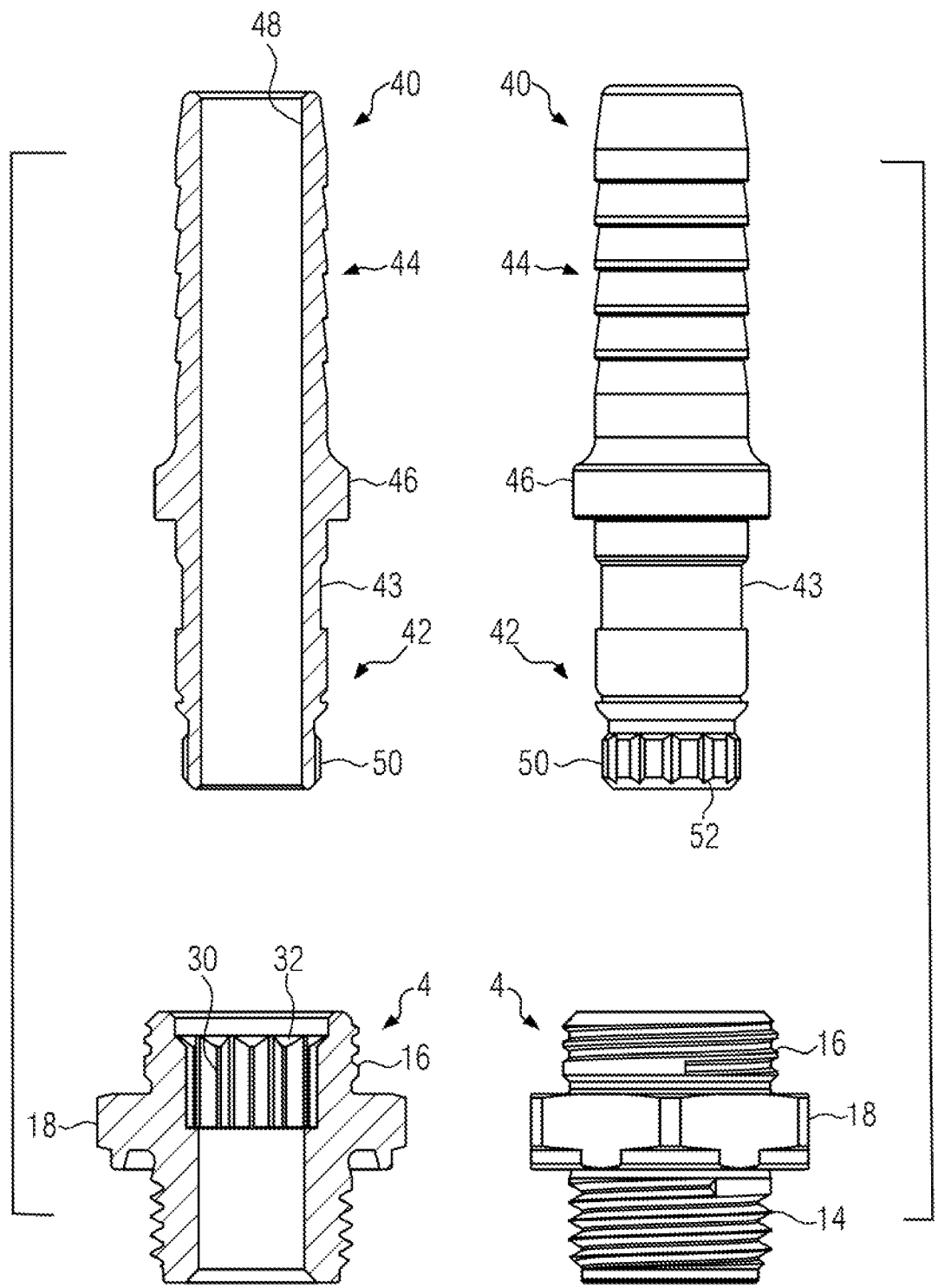

HOSE CONNECTOR ASSEMBLY

This application is the National Stage of International Patent Application No. PCT/EP2017/079422, filed on Nov. 16, 2017, the contents of which are incorporated herein by reference.

The present invention is directed to a hose connector assembly for connecting a hose to a port of a pressurized fluid system, the system comprising a socket and an adapter tube, both having a through-going passage in fluid communication with each other, the socket being adapted to be connected to a port with one of its end portions and having a receiving opening as part of its passage in its opposite end portion, wherein the adapter tube has plug-in end portion to be pushed into the receiving opening which is adapted to cooperate with the plug-in end portion of the adapter tube to form a plug-in connection mechanism, wherein the adapter tube has, opposite to the plug-in end portion, a hose connector end fitting adapted to be received in and hold a hose end portion placed thereon to thereby retain the hose.

The term hose as used in the present application is not limited to rubber hoses but is intended to cover any flexible tube.

In many applications hoses have to be connected to ports of pressurized fluid flow systems, in particular for hydraulic or pneumatic actuating systems in the automotive industry. The hose connector assemblies have to be designed in such a manner that leakage is reliably prevented and unintentional release of the hose is safely excluded. This is of particular importance in applications where deficiencies or malfunctions of the hose coupling can be hazardous or lead to serious damages, for example in braking systems of vehicles. On the other hand, it is desired that the hose can be connected with an assembly procedure which is as simple as possible. For this purpose plug-in connections have been developed, in which a plug-in component connected to the hose is pushed into a socket and a plug-in connection mechanism is engaging the plug-in component in the socket to retain it engaged in the socket. No tools are needed to form the plug-in connection to connect a hose to a port of a pressurized fluid system in this manner, and there can be an audible or visible feedback indicator demonstrating to the assembly worker that the plug-in component has reached its fully engaged plugged-in state.

A hose connector assembly is disclosed in WO 97/13094 A1. The connector assembly comprises a socket which has a threaded elongation at one end which is configured to be connected to a standard port of a pressurized fluid system. In the opposite end portion of the socket a receiving opening is formed. An adapter tube is provided which has a hose connector end fitting which is described as a threaded elongation suitable for direct mounting of a hose. The opposite end of the tube adapter is formed as a plug-in end portion including several circumferential grooves for mounting sealing rings thereon, and a further circumferential groove in which a locking ring as part of the plug-in connection mechanism is mounted. A further means of the plug-in connection mechanism is provided in the socket by a frusto-conical, inwardly tapering circumferential wall portion close to the open end of the receiving opening. When the plug-in end portion of the adapter tube is pushed into the receiving opening the locking ring slides along the inwardly tapering frusto-conical wall portion and is thereby compressed to a smaller diameter. At the end of the inwardly tapering frusto-conical wall portion a shoulder is formed which delimits an adjacent circumferential groove in the inner wall of the receiving opening. When the locking ring reaches the shoulder at the of the frusto-conical wall portion the locking ring expands into the groove adjacent the shoulder. In this plugged-in state the locking ring is received in the circumferential groove in the inner wall of the receiving opening on the one hand, and on the other hand in the circumferential groove of the outer wall of the plug-in end portion of the adapter tube such that the latter is locked in the receiving opening of the socket. Both the receiving opening of the socket and the plug-in end portion of the adapter tube are essentially cylindrical components, i.e. both are rotationally symmetric around their longitudinal axes. For this reason the plug-in connection of the adapter tube to the socket does not rotationally lock the adapter tube and therefore the hose connected thereto with respect to the socket. There are many applications in which a hose is at one of its ends connected to a component fixed to the chassis of a vehicle, and at its other end to a component which is moveable with respect to the chassis. An example in the automotive industry are pneumatic braking systems in which all brake valves are assembled on the chassis, whereas the brake actuators are located on the axles close to the wheels. Therefore, hoses connecting the brake valves to the brake actuators have to follow movements when the wheels are moving in their suspension with respect to the chassis. The movements of the hoses are transmitted also to the hose connecting assemblies and may result in relative rotations of the adapter tube with respect to the socket. Relative rotations of adapter tube and socket cause wear and tear, and may in the long run result in damages (leakages) of the hose connector assembly.

In order to prevent such relative rotation of the adapter tube of the hose in the socket, currently external fixation means are mounted which engage a portion of the adapter tube externally and mechanically connect it to fix it relative to the socket to avoid relative rotation between them. However, such external connection requires a separate mounting component, for example in the form of a clamp, and a separate assembly step for mounting such component.

Another type of a hose connector assembly including a plug-in mechanism is described in EP 2 217 843 A1. This hose connector assembly does not utilize an adapter tube. Instead a hose support body is provided in the receiving opening of a socket, which socket is at its end opposite to the receiving opening provided with an external thread for connecting it to a port. The hose support body comprises a bushing having an external diameter equal to the inner diameter of the hose to be connected. The bushing is received in the hose when the hose is pushed into the receiving opening and onto the bushing. The hose support body further comprises unitary cylindrical outer wall structure surrounding the bushing and leaving a gap inbetween which allows the hose to enter the gap when the hose is pushed into the receiving opening and onto the bushing. There is a further sleeve-like insert provided in the receiving opening which insert is in abutment on the inner wall of the receiving opening and surrounding the bushing in a region adjoining the opening end of the receiving opening. The inner wall of the insert includes a frusto-conical or tapering circumferential wall portion which tapers to smaller diameters in the direction towards the opening end of the receiving opening. This tapering circumferential wall portion forms part of the plug-in connection mechanism and cooperates with a gripping means that can have the form of an open gripping ring. The gripping means have a sharp edge pointing radially inwardly towards the hose when the hose is received on the bushing. The gripping means are mounted in the area of the tapering circumferential wall portion of the insert and are in contact with this tapering wall portion but movable with respect thereto. When the hose is pushed into the socket and onto the bushing of the insert the gripping means contact with the sharp edge the outer surface of the hose. The gripping means form in cooperation with the tapering circumferential wall portion of the insert the plug-in connection mechanism. Once the hose has been fully inserted into the receiving opening any force attempting to pull the hose out of the receiving opening of the socket will result in a corresponding force on the gripping means which are thereby urged to slide along the tapering circumferential wall portion of the insert. In this manner the gripping means are urged into even tighter engagement with the outer surface of the hose such that it is securely retained in the receiving opening of the socket. The hose support body further comprises a projecting tongue projecting into the gap between the outer wall structures of the hose support body and its internal bushing. The purpose of this tongue projecting into the gap is to provide an audible feedback that the hose reached its fully inserted position. When the hose is pushed into the receiving opening and onto the bushing of the hose support body the leading end of the hose urges the projecting tongue and eventually breaks the projecting tongue away when it is fully inserted into the gap between the inner bushing and the outer wall structures of the hose support body. The breaking of the tongue provides an audible feedback to the assembly worker that the hose is fully inserted and properly and safely connected to the socket. While this hose connector assembly also allows for a simple assembly procedure for connecting the hose to the socket by simply pushing it into the receiving opening of the socket, it also suffers from the drawback that the hose has no defined rotational position (around the longitudinal axis of the receiving opening), and it does not provide any rotational lock for the hose within the socket when it is in the plugged-in state therein. A similar hose connector assembly is described in WO 2009/068934 A1.

It is an object of the present invention to provide a hose connector assembly that allows for a simple and efficient assembly process to connect the hose on the one hand, and that provides for a rotationally locked positioning of the hose with respect to the socket of the connector assembly.

According to the present invention the receiving opening of the socket in which the plug-in end portion of the tube adapter is inserted and this plug-in end portion of the adapter tube are provided with complementary locking surfaces which engage each other when the plug-in end portion of the adapter tube is connected by the plug-in connection mechanism to the socket to thereby lock the adapter tube with respect to the socket against rotational movement about the longitudinal axis of the adapter tube within the socket. In other words the complementary locking surfaces of the adapter tube and the socket are not rotationally symmetric about the longitudinal axis of the adapter tube so that they are locking the two components against relative rotation. In this manner the desired rotational lock between socket and tube adapter is provided without a further separate locking component and without need for a further separate assembly step for mounting such component. Instead the rotational lock is automatically achieved when the tube adapter reaches the fully engaged plug-in position in the socket.

The complementary locking surfaces can for example be a plurality of notches around the circumference of the outer wall of an end portion of the adapter tube, and a plurality of complementary wedge-shaped projections (teeth) on the inner wall of the receiving opening of the socket which come into engagement with each other to completely lock the two components against rotation relative to each other. The wedge-shaped projections are wedged-shaped in a cross-sectional view in a plane perpendicular to the axial direction of the socket. The wedge-shaped teeth or projections of the locking surfaces of the socket each may have an apex extending parallel to the axial direction of the socket. The notches of the locking surfaces of the adapter tube may likewise extend over a distance in a direction parallel to the axial direction of the adapter tube. In this manner the ridges of the wedge-shaped projections of the locking surfaces of the socket may slide into the notches of the locking surfaces of the adapter tube when the adapter tube is inserted into the socket. However it is clear that there may be many other arrangements and configurations of respective locking surfaces which may be brought into rotational engagement by axially moving the locking surfaces of the adapter tube to come into contact with the complementary locking surfaces of the socket when the adapter tube is inserted into the socket. The locking surfaces may for example also be a polygonal outer wall at the plug-in end portion of the adapter tube, and a complementary polygonal inner wall in the receiving opening of the socket. In principle any complementary inner wall configuration of the socket and cooperating complementary outer wall configuration of the plug-in end portion of the adapter tube which come into abutment with each other in the plugged-in state of the adapter tube are suitable as long as they are not rotationally symmetric around the axes of the adapter tube and the socket.

The socket is typically made of metal, and also the adapter tube can be made of metal, or alternatively of hard plastics. Both metals and plastics are suitable for forming dimensionally stable locking surfaces thereon, suitable for engagement with each other to prevent any rotation of the locking surfaces about the longitudinal axis of the adapter tube relative to each other.

In a preferred embodiment the wedge-shaped projections are provided with end faces facing in axial direction that are chamfered or inclined. The opposite axial end faces of the locking surfaces of the adapter tube are chamfered in a complementary manner to the end faces of the wedge-shaped projections such that, when the adapter tube is inserted into the socket and the wedge-shaped projections are rotationally offset with respect to the notches, the end faces of the wedge-shaped projections and the axial end faces of the locking surfaces of the adapter tube come into abutment and are able to slide along each other which has a centering effect so that the longitudinal axes of the adapter tube and of the socket become aligned and coinciding. If necessary the assembly worker inserting the adapter tube into the socket has to rotate the two parts slightly with respect to each other in this assembly process so that the tips of the wedge-shaped projections are aligned with the centers of the notches such that the tips of the wedge-shaped projections slide into the notches when the adapter tube is being fully inserted into the socket. The complementary chamfered end faces of the locking surfaces of the adapter tube and the socket serve as guiding surfaces centering the two parts with respect to each other and facilitating rotational alignment of the wedge-shaped projections and the notches such that the tips of the wedge-shaped projections may slide in axial direction into the notches to reach the fully engaged state.

In a preferred embodiment the plug-in connection mechanism includes a gripping ring which is moveable inside of the receiving opening in axial direction over a limited range and which has an inwardly pointing sharp edge to come into contact with the outer surface of the adapter tube, wherein the gripping ring as adapted to cooperate with a tapering circumferential wall portion of the inner wall of the receiving opening which tapers towards the receiving end of the receiving opening such that the gripping ring is, by sliding along the tapering wall portion, gripping the adapter tube tighter the more a force attempting to pull out the adapter tube is acting thereon. By receiving and the end of the receiving opening is mend into which the adapter tube is introduced into the socket. The gripping ring of this plug-in connection mechanism does not have to be a closed ring, but could also be an open ring with a slit or could be composed of several ring segments distributed around the circumference in the area of the tapering circumferential wall portion of the interior of the receiving opening.

The socket is preferably not a unitary component but is composed of a screw tube and a nut releasably connected to each other by a screw connection, wherein the receiving opening of the socket is formed in the nut and in an adjoining part of the screw tube. The screw tube is externally threaded and is adapted to be screwed into an internal thread of the nut at the end opposite to the receiving end of the receiving opening formed in the nut. This two-part design of the socket allows to assemble the sealing ring and the gripping ring in the interior of the nut before the nut is screwed onto the screw tube to form the socket. Furthermore, this two-part design allows to unscrew the nut to get access to the interior for maintenance purposes and for allowing replacement of inner components of the socket.

Preferably, the locking surfaces of the socket are located on the inner wall of the screw tube, i.e. the rotationally locking engagement is established between the screw tube of the socket and the adapter tube. In other words, there are no locking surfaces in the nut. This is advantageous because it allows to disconnect the hose from the port by first unscrewing the nut, and then withdrawing the adapter tube with the nut from the screw tube in axial direction. When unscrewing the nut the hose fitted on the adapter tube is not turned with the nut since the adapter tube is rotationally locked to the screw tube that remains in place in the port at this stage. Therefore, unscrewing of the nut is not accompanied by twisting the tube as in the prior art where disassembling a rotation secured hose connector resulted in twisting the hose connected to the hose connector assembly.

Preferably, the inner wall of the nut surrounds the receiving opening and comprises at least one circumferential groove in which a sealing ring is received and is, closer to the receiving end of the receiving opening than the sealing ring, provided with the tapering circumferential wall portion tapering in the direction towards the receiving end of the receiving opening. Screw tube and nut have communicating passageways therethrough which together form the trough-going passage of the socket.

In a preferred embodiment the screw tube is, on its end portion opposite to the external thread for connection to the nut, provided with an external thread adapted for screwing it into an internal thread of a port, i.e. it is dimensioned to fit to the internal thread of a standard port to which it is intended to be connected. The threaded end portions of the screw tube at both of its end portions are separated by a circumferential flange in which, at the side facing in the direction of the threaded end portion for connection to the port, a circumferential groove is formed in which a screw tube sealing ring is received for sealing the screw tube against the port when the screw tube is connected thereto.

In a preferred embodiment the circumferential groove in the inner wall of the nut for receiving the sealing is disposed adjacent the internal threaded portion of the nut such that the end of the screw tube contacts the sealing ring when the screw tube is fully screwed into the nut. The tapering circumferential wall portion is formed on the inner wall of the interior of the receiving opening in the nut closer to the receiving end of the receiving opening then the circumferential groove with the nut sealing ring.

In a preferred embodiment there is, following the tapering circumferential wall portion in the interior of the receiving opening in direction towards the receiving of the receiving opening, a second circumferential groove in which an environmental seal is received for sealing the interior of the receiving opening when the adapter tube is plugged-in state therein.

In a preferred embodiment the plug-in end portion of the adapter tube is provided with a peripheral recess portion extending over a certain axial distance and having a smaller outer diameter then adjacent cylindrical portions of the plug-in end portion. The peripheral recess portion is arranged on the plug-in end portion in an axial region thereof such that, when the plug-in end portion is inserted into the socket but has not reached the full inserted position, the environmental seal is located in the region of the peripheral recess portion such that, when pressurized air is applied to the hose connector assembly, pressurized air is leaking trough the peripheral recess portion and past the environmental seal. This design allows to perform a test for checking whether the adapter tube is correctly and fully inserted and connected to the socket. This test is performed by applying pressure to the hose connector assembly. In case the adapter tube is not correctly and fully inserted pressurized air will flow through the peripheral recess portion of the plug-end portion. If the test pressure value is sufficiently high the pressure on the environmental seal created by the flow through the peripheral recess portion is sufficient to blow out the environmental seal. If in the test the environmental seal is blown out this is a clear indication and feedback that the adapter tube is not correctly connected. In this case the adapter tube has to be removed from the socket again, the environmental seal has to be mounted in the receiving opening of the socket again, and the adapter tube has to be inserted again into the receiving opening of the socket until it has reached its fully inserted position.

In a preferred embodiment the plug-in end portion is provided with the reduced diameter outer end portion including the locking surfaces, which reduced diameter outer end portion has a reduced outer diameter compared to the adjacent cylindrical portion adjacent to the peripheral recess portion. This reduced diameter outer end portion is located in an axial region of the plug-in end portion such that, when the plug-in end portion has not reached its fully inserted portion in the socket, the sealing ring of the socket is disposed in the region of the reduced diameter outer end portion such that pressurized air apply to the hose connector assembly is able to pass by the sealing ring and the peripheral recess portion.

In a preferred embodiment the peripheral recess portion and the adjacent cylindrical portions are arranged in axial direction on the plug-in end portion such that, when the plug-in end portion is fully inserted in the receiving opening of the socket, one cylindrical portion abuts the environmental seal and the other cylindrical portion abuts the sealing ring.

In a preferred embodiment the screw tube and the nut are adapted such that the end face of the nut surrounding the end of the passageway opposite to the their receiving opening comes into abutment on a side surface of the flange of the screw tube when the nut is screwed onto the screw tube, and that a further circumferential groove with a nut sealing ring is provided in the abutment area of the end face of the nut on the flange of the screw tube to seal the connection between screw tube and nut when the nut is completely screwed onto the screw tube.

In a preferred embodiment the hose connector end fitting of the adapter tube is provided by a fir tree tube end section to be received in and end portion of the hose to hold the hose end portion under tension thereon. The inner diameter of the hose is slightly smaller than the outer diameter of the fir tree tube end section such that the hose is slightly expanded and tensioned when it is pulled onto the hose connector end fitting.

In a preferred embodiment a bent intermediate portion is formed between the plug-in end portion and the hose connector end fitting of the adapter tube such that the hose connector end fitting has an axial direction that is inclined with respect to the axial direction of the plug-in end portion. The bent intermediate portion may for example be shaped such that it makes a 90° turn.

Figure 1B:
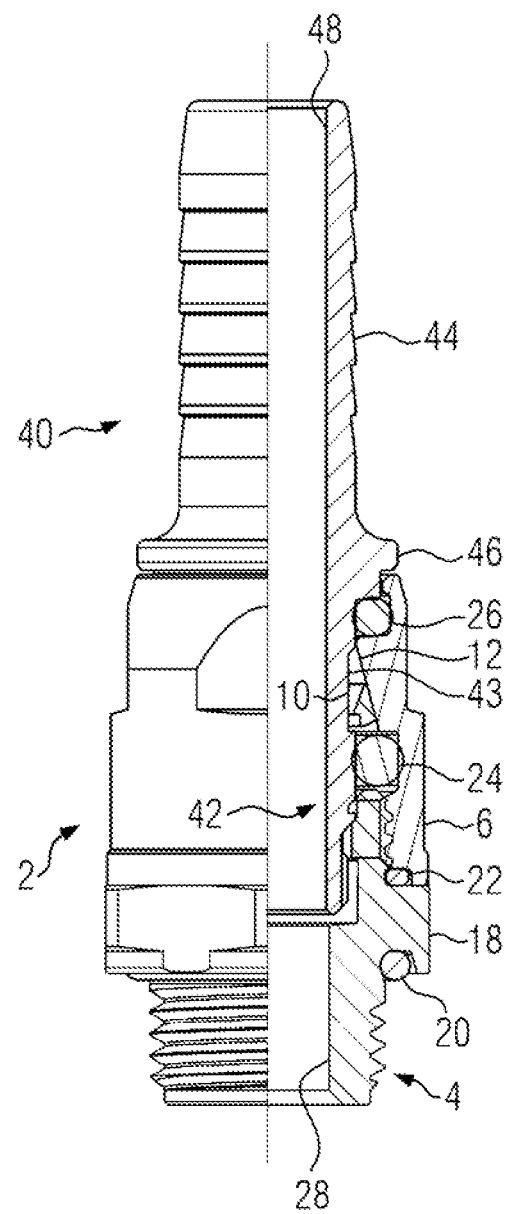
Figure 2A:
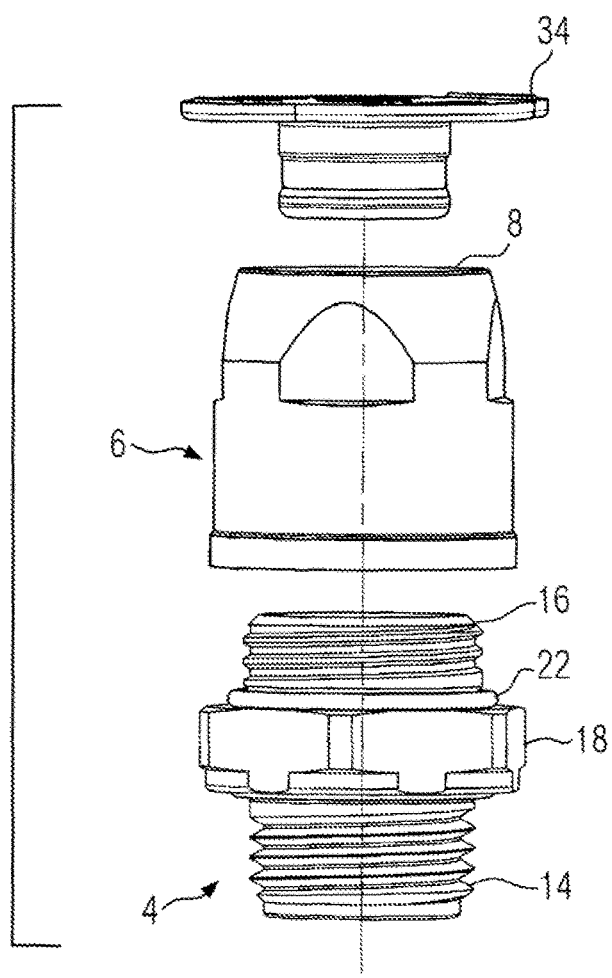
Figure 2B:
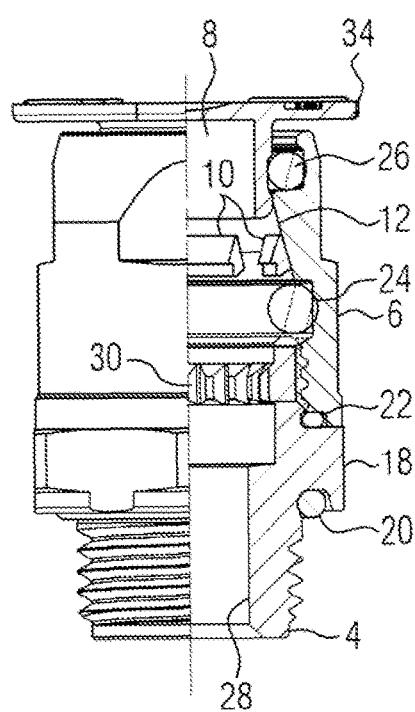
Figure 3A:
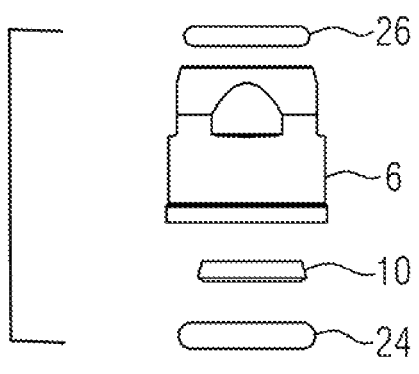
Figure 3B:
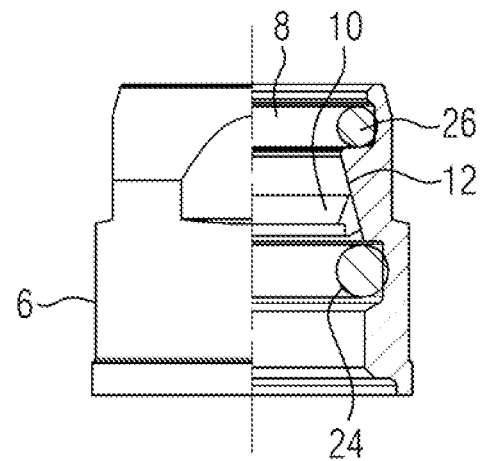
Figure 4A:
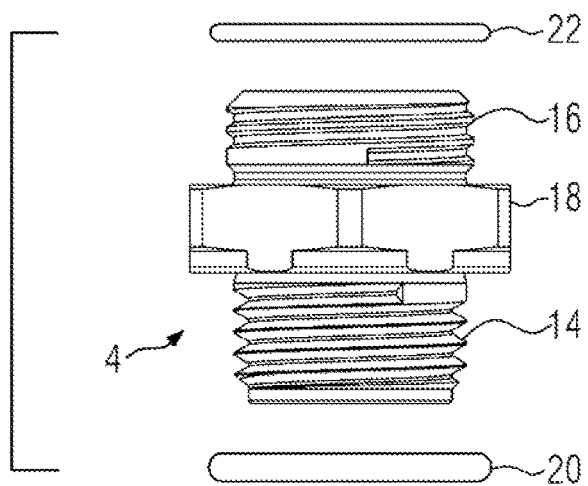
Figure 4B:
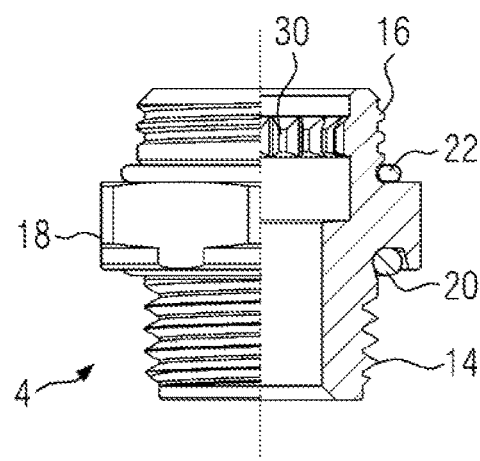
Figure 6B:
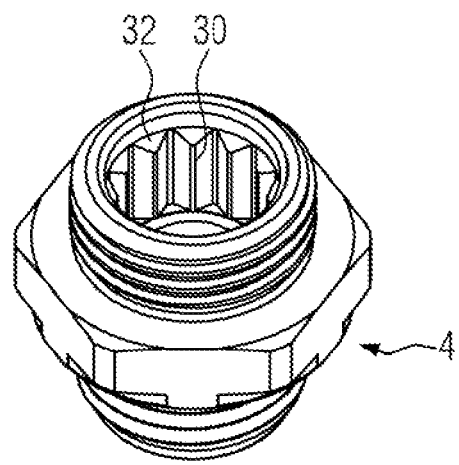
Figure 6A:
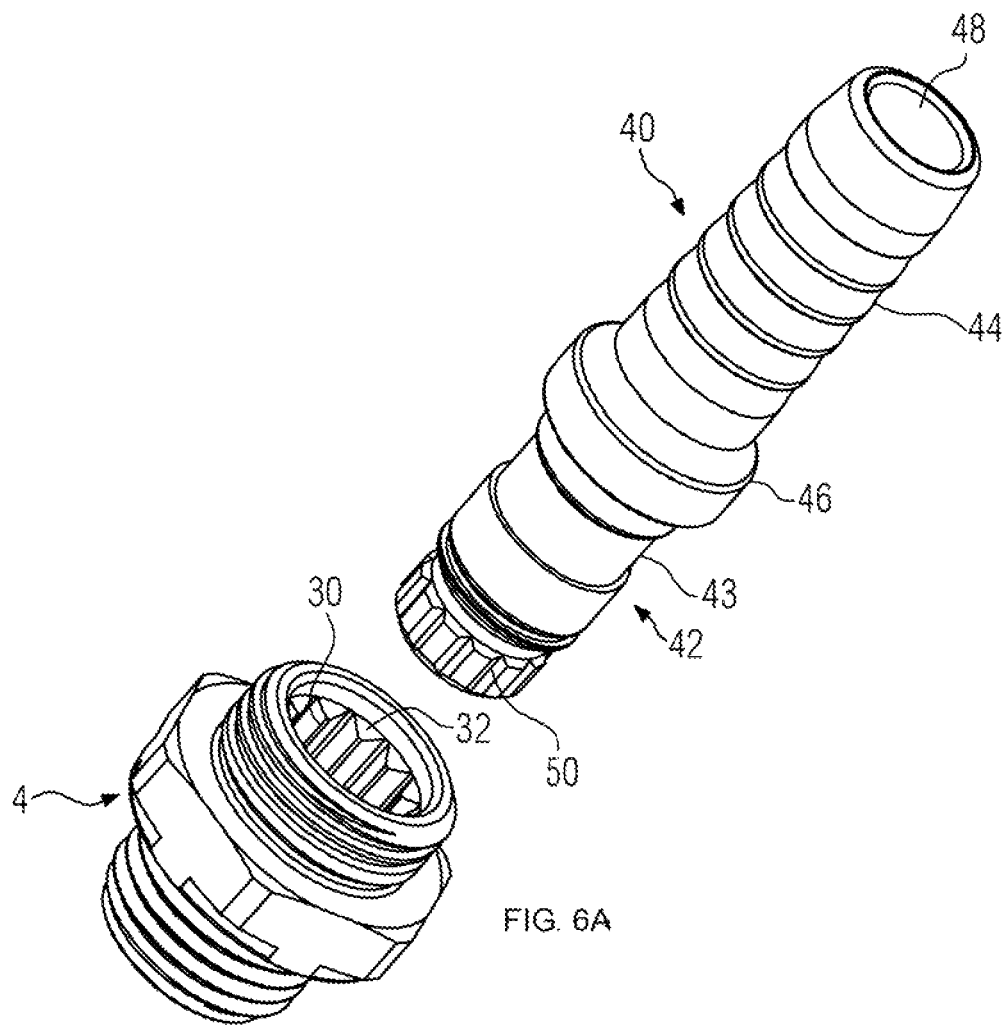
Figure 8A:
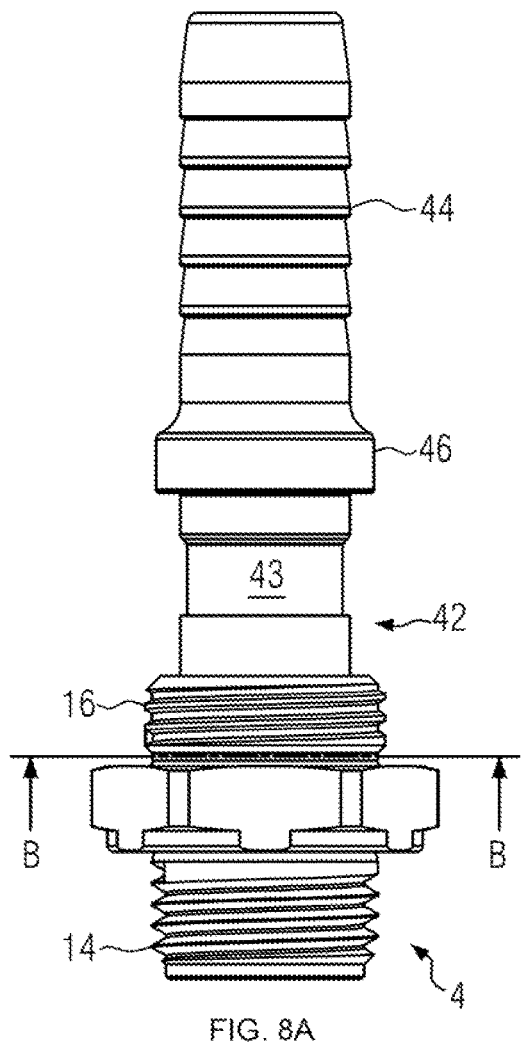
Figure 8B:
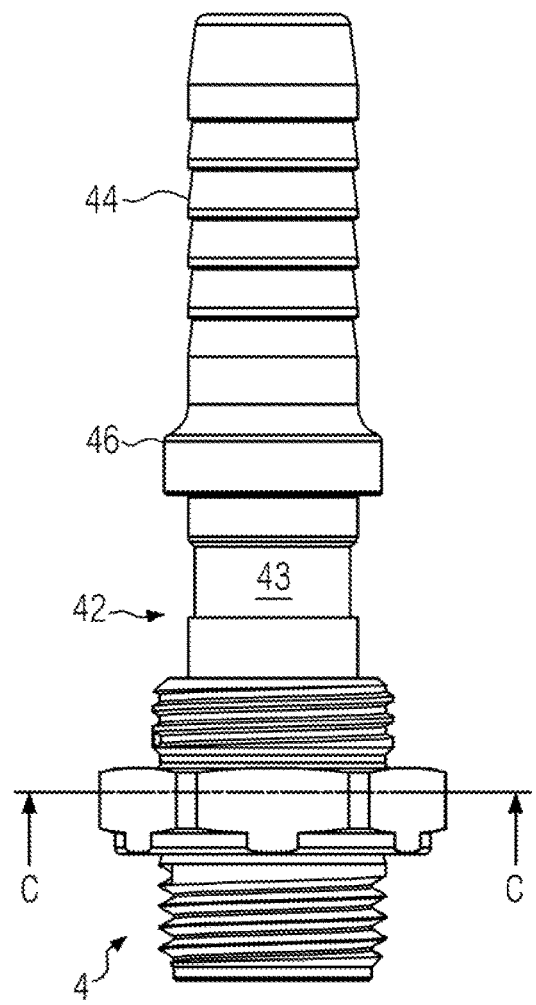
Figure 9A:
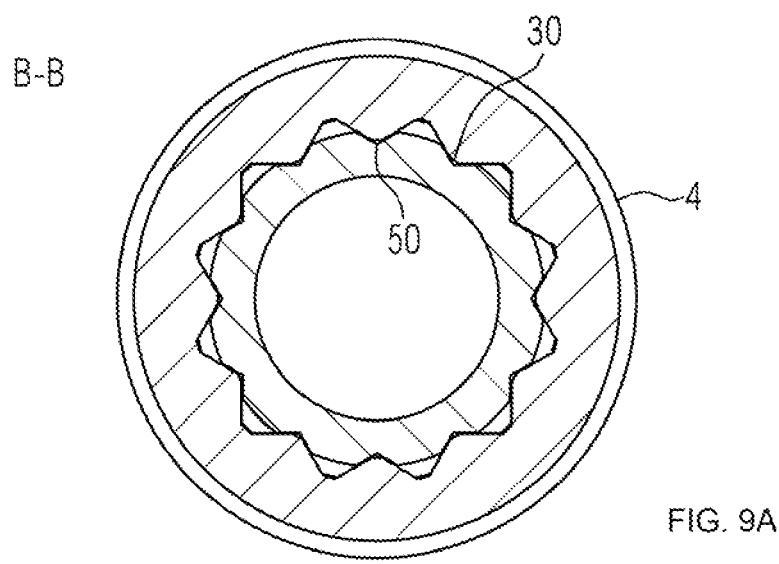
Figure 9B:
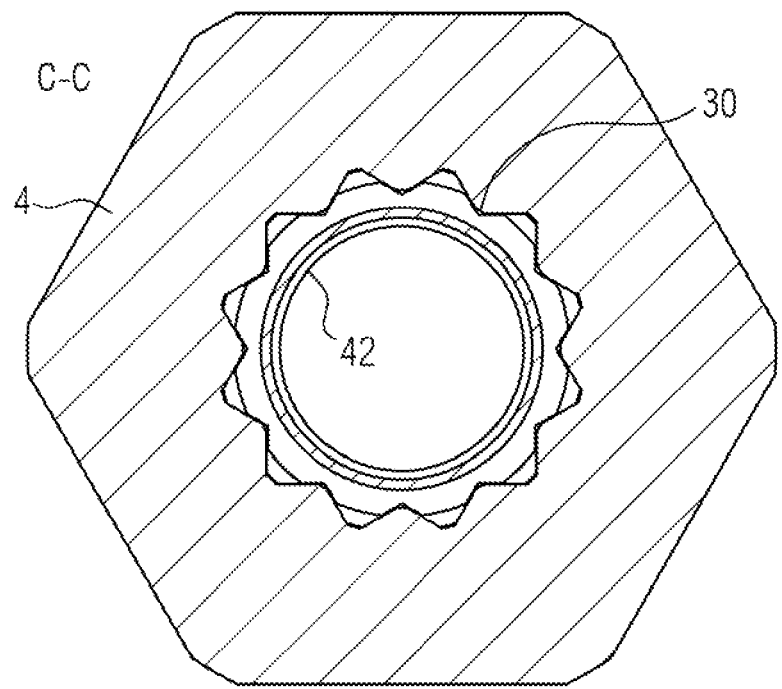

The invention will now be described with reference to a preferred embodiment shown in the drawings in which:

FIGS. 1A and 1B (collectively referred to as FIG. 1 unless otherwise indicated) show the hose connector assembly of a first embodiment in a disassembled state as a plan view on the left hand side (FIG. 1A) and on the right hand side in a plugged-in state (FIG. 1B), wherein this view is partially in cross-section (here and in FIG. 3B the partial cross-sectional views on the right hand side are at the scale 2:1 compared to the plan views on the left hand side);

FIGS. 2A and 2B (collectively referred to as FIG. 2 unless otherwise indicated) show two views a socket of the hose connector assembly of the first embodiment, on the left hand side (FIG. 2A) as an exploded view and on the right hand side (FIG. 2B) in an assembled state and partially in cross-section;

FIGS. 3A and 3B (collectively referred to as FIG. 3 unless otherwise indicated) show two views of a nut of the socket of the hose connector assembly of the first embodiment, on the left hand side (FIG. 3A) as an exploded view and on the right hand side (FIG. 3B) in an assembled state and partially in cross-section;

FIGS. 4A and 4B (collectively referred to as FIG. 4 unless otherwise indicated) show two views of a screw tube of the socket of the hose connector assembly of the first embodiment, on the left hand side (FIG. 4A) as an exploded view and on the right hand side (FIG. 4B) in an assembled state and partially in cross-section;

FIGS. 5A and 5B (collectively referred to as FIG. 5 unless otherwise indicated) show a plan view and a cross-sectional view of the hose connector assembly according to a second embodiment, and a cross-sectional view thereof with an enlarged detail;

FIG. 6A shows an exploded view of the hose connector assembly of FIG. 5, wherein nut of the socket has been omitted for simplification of the graphics here and in the following Figures, and a further perspective view of the screw tube (FIG. 6B), with FIGS. 6A and 6B collectively referred to as FIG. 6 unless otherwise indicated;

FIGS. 7A and 7B (collectively referred to as FIG. 7 unless otherwise indicated) show a cross-sectional view (FIG. 7A) and a plan view (FIG. 7B) of the hose connector assembly according to FIGS. 6A and 6B in the disassembled state;

FIGS. 8A and 8B (collectively referred to as FIG. 8 unless otherwise indicated) show a plan view of the hose connector assembly of FIGS. 6 to 7 in the assembled state with two planes B-B and C-C indicated; and FIGS. 9A and 9B (collectively referred to as FIG. 9 unless otherwise indicated) cross-sectional views taken along planes B-B (FIG. 9A) and C-C (FIG. 9B) as indicated in FIG. 8.

As shown in FIG. 1 the hose connector assembly comprises two main components, a socket 2 and an adapter tube 40. Both are essentially tubular or sleeve-like components, wherein the adapter tube 40 has a central passage 48 and the socket 2 has a central passage 28 in fluid communication with the central passage 48 of the adapter tube 40, the passages 48 and 28 extending through the entire adapter tube 40 and the entire socket 6 such that in the assembled state fluid can flow through the adapter tube 40 and the socket 2.

The adapter tube 40 includes a plug-in end portion 42, and at the opposite end a hose connector end fitting 44 in the form of a fir tree tube end section. The hose connector end fitting 44 is adapted such that a hose to be connected to the adapter tube 40 can be pulled over the hose connector end fitting 44, wherein the hose end section is slightly expanded when pulled onto the hose connector end fitting 44 and is therefore held under tension on the hose connector end fitting 44. The hose connector end fitting 44 and the plug-in end portion 42 are separated by a circumferential flange 46.

At the outer end of the plug-in end portion 42 locking surfaces 50 are provided by a plurality of notches which are circumferentially distributed around the periphery of the end portion of the plug-in end portion 42. As can better be seen in the perspective view of FIG. 6, the notches can also be seen as being formed by a plurality of projections, each projection having the shape of a blunted wedge, i.e. a wedge with its apex removed, wherein between each pair of adjacent blunted wedge-shaped projection a notch is formed. The arrangement of the locking surfaces 50 and the complementary locking surfaces 30 will be described in more detail below.

The socket will now be described in more detail with reference to FIG. 2. First with reference to the exploded view on the left hand side in FIG. 2A, the socket comprises a screw tube 4 and a nut 6 which together form a central passage 28 (see FIG. 1) therethrough. Screw tube 4 includes external threads 16 at one end portion for engagement with internal threads in the inner wall of nut 6. At the opposite end the screw tube 4 has external threads 14 adapted to be screwed into internal threads of a standard port of a pressurized fluid system. The external threads 14, 16 at both end portions are separated by a flange 18 which comes into contact with the end face of a wall surrounding the opening of the port into which the screw tube 4 is screwed with its external threads 14. As indicated in the right hand view of FIG. 1B, flange 18 of the screw tube 4 is on the side facing the external threads 14 provided with a circumferential groove in which a port sealing ring 20 is received for sealing the screw tube 4 against the port (not shown) when it is connected thereto. As shown in FIG. 2B on the opposite side of flange 18 a screw tube sealing ring 22 is received in a circumferential groove in the end face of nut 6 for sealing nut 6 against the screw tube 4 when the two are in the assembled state.

The socket has a receiving opening 8 (see FIGS. 1 and 2) which extends through the entire nut 6 and into an adjoining part of the passage of screw tube 4. The receiving opening 8 is adapted to receive the plug-in end portion 42 of the adapter tube 40. The receiving opening 8 is equipped with a plug-in connection mechanism adapted to hold the adapter tube 40 retained in the receiving opening 8 once it has been inserted. The plug-in connection mechanism includes in particular a gripping ring or clamping ring 10 (see FIGS. 2 and 3) located inside of the receiving opening and extending circumferentially close to the interior wall of the receiving opening 8. The gripping ring 10 is not necessarily a closed ring, but may rather be a split ring having a gap in its circumference or may be composed of several ring segments which are circumferentially distributed to surround the plug-in end portion of an adapter tube. Such a configuration of a split ring is preferred since such a split ring is capable of being compressed by a radially inwardly directed force to a reduced diameter. The gripping ring 10 has an radially inwardly directed sharp edge which is intended to come into contact with the outer surface of the plug-in end portion 42 of the adapter tube 40 when it is inserted into the receiving opening 8 of the socket 2.

As shown in FIGS. 2 and 3 the gripping ring 10 is located in the interior of the receiving opening 8 in an area of a frusto-conical or tapering circumferential wall portion 12 which tapers in the direction towards the receiving end of the receiving opening 8. In other words in the area of the tapering circumferential wall portion 12 the inner radius of the inner wall gets smaller the closer one gets to the receiving end. The gripping ring 10 and the frusto-conical or tapering circumferential wall portion 12 cooperate to retain the adapter tube 40 in the plugged-in state in the socket in the following manner. Once the plug-in end portion 42 has been fully inserted into the socket as shown on the right hand side of FIG. 1B, the gripping ring 10 is with its sharp edge in contact with the outer surface of the plug-in end portion 42 of the adapter tube 40. If any force is acting on the adapter tube 40 attempting to pull the adapter tube 40 out of the socket 2 the gripping ring 10 is likewise pulled and axially moved over a small axial distance with the adapter tube 40 along the frusto-conical wall portion 12 in a direction towards the receiving end of receiving opening 8. This has the effect that gripping ring 10 is sliding along the tapering circumferential wall portion 12 over the same small distance which compresses the gripping ring 10 and urges its sharp edge in even tighter contact with the outer surface of the plug-in end portion 42, thereby effectively preventing any further axial movement of the adapter tube 40 out of the socket 2 which is thereby retained in the socket.

As shown in particular on the right hand sides of FIGS. 2C and 3B the receiving opening 8 is provided with a first circumferential groove located adjacent the tapering circumferential wall portion 12 at a larger distance from the receiving end of receiving opening 8, which first circumferential groove holds an adapter tube sealing ring 24 for sealing the adapter tube in the receiving opening in the assembled state as shown in the right hand view in FIG. 1B.

On the opposite side in axial direction the tapering circumferential wall portion 12 is followed by a second circumferential groove in which an environmental seal 26 is received which seals the interior of the receiving opening 8 of the socket when the adapter tube 40 is in the plugged-in state in the socket 2, thereby protecting the interior of the receiving opening against ingress of dust, particles and moisture.

As already mentioned above the outer end of the plug-in end portion 42 of the adapter tube 40 is provided with locking surfaces 50 in the form a plurality notches formed by a plurality of blunted wedge-shaped projections which are circumferentially distributed about the periphery of the tip portion of the plug-in end portion 42 (the term "blunted wedge-shaped projections" refers to the shape of the projections in cross-section in a plane perpendicular to the axial direction of the adapter tube). In the inner end of the receiving opening 8 there are complementary shaped locking surfaces 30 (see FIGS. 2 and 4) in the form of wedge-shaped projections or teeth which are complementary to the notches which engage with the notches between the blunted wedge-shaped projections 50 of the plug-in end portion 42 of the adapter tube 40 when the plug-in portion 42 thereof is fully inserted into the receiving opening 8 of socket 2. The projections 30 of the socket 2 engage the notches between the blunted wedge-shaped projections 50 distributed about the circumference of the adapter tube. This engagement serves as a locking structure which prevents any rotational movement of the adapter tube 40 within the socket 2 when the adapter tube 40 is in the assembled, plug-in connected state in the socket 2.

As can be seen in FIG. 2 a cover 34 with a circumferential flange is provided which may be inserted into the receiving end of receiving opening 8. This cover 34 loses the receiving opening. It is inserted after assembly of the socket 2. The purpose of the cover 34 is to protect the interior of the receiving opening during shipment and storage against ingress of dust and moisture. When the house connector is to be assembled and mounted cover 34 is removed before the adapter tube 40 with the hose attached on its hose connector end fitting 44 is inserted with its plug-in end portion 42 into the receiving opening of the socket 2 and is engaged there by the plug-in connection mechanism.

In the following reference is made to FIGS. 5 to 9 showing a second embodiment of the hose connector assembly. The differences with respect to the first embodiment are minor. The first main difference is that the circumferential flange 46 has no radial projection beyond the wall of the nut 6 in the second embodiment. A second difference is the axial elongation of the locking surfaces 30 of the socket: In the second embodiment the axial elongation of the wedge-shaped projections is larger (see FIG. 7) in comparison to the first embodiment (see FIG. 2), i.e. in the second embodiment as shown in FIG. 7 the wedge-shaped projections 30 extend deeper into the screw tube 4). However, this axial elongation is of no relevance as long as there is an overlap region in axial direction of the locking surfaces of the socket and of the adapter tube, in which overlap region a rotational locking engagement between the rotational locking surfaces of the socket and of the adapter tube is established.

FIG. 5 shows on top (FIG. 5A) a plan view of the hose connector assembly, and in the lower part (FIG. 5B) a cross-section at plane A-A, wherein the cross-sectional view of FIG. 5B is similar to the one of FIG. 1B. In the assembled state, when the adapter tube 40 is fully received in the socket 2 rotational locking surfaces 30 of the socket are in engagement with rotational locking surfaces 50 of the plug-in end portion of the adapter tube. As can be seen in the enlarged detail of the cross-section of FIG. 5B, a portion of the rotational locking surfaces 50 of the adapter tube is axially overlapping with the locking surfaces 30 of the socket. Therefore, locking surfaces 30 and 50 provide rotational engagement and a rotational lock for the adapter tube 40 within the socket 2.

The arrangement of the rotational locking surfaces 30 and 50 will be further explained with reference to FIGS. 6 to 9. As can be seen in FIG. 7 the rotational locking surfaces 50 of the adapter tube 40 are located at the inner end portion of the adapter tube 40. In this embodiment the locking surfaces 50 of the adapter tube 40 are formed by a plurality of blunted wedge-shaped projections circumferentially distributed around the inner end portion of the adapter tube 40 (as already mentioned above, the wording "blunted wedge-shaped projections" describes the shape of the projections in cross-section in a plane perpendicular to the axial direction of the adapter tube). This blunted wedge-shaped configuration of the locking surfaces 50 can be best seen in FIG. 6. The locking surfaces 50 are configured as a plurality of blunted wedge-shaped projections, i.e. a plurality of adjacent blunted wedge-shaped projections distributed around the circumference of the inner end portion of the adapter tube, each of the wedge-shaped projections having its apex removed such that for each projection a planar outer surface remains having notches at each of its sides which are left over from the plurality of original wedge-shaped projections. The locking surfaces of the adapter tube may thus also be viewed as a plurality of circumferentially distributed, axially extending notches, each pair of adjacent notches being separated by a planar surface portion in-between.

The locking surfaces 30 of the socket 2 are formed by a plurality of wedge-shaped projections inwardly projecting from the inner wall of the receiving opening of the socket 2 (also here the wording "wedge-shaped projections" refers to the shape in cross-section in a plane perpendicular to the axial direction of the socket). The number wedge-shaped projections of the locking surfaces 30 of the socket 2 is equal to the number of notches of the locking surfaces 50 of the adapter tube 50 such that each wedge-shaped projection of the locking surfaces 30 of the socket 2 is received in a notch of the locking surfaces 50 of the adapter tube when the letter is fully inserted into the socket 2.

As can be seen from FIG. 7 the locking surfaces 30 of the socket, here in screw tube 4, have chamfered or inclined axial end faces 32, and the locking surfaces 50 of the plug-in end portion have complementary, inclined end faces 52. These complementary chamfered end faces 32, 52 have the effect that, when the adapter tube is inserted into the socket, the end faces 32 of the wedge-shaped projections and the axial end faces 52 of the locking surfaces of the adapter tube come into abutment and are able to slide along each other which has a centering effect so that the longitudinal axes of the adapter tube and of the socket become aligned and coinciding. In addition, these complementary inclined end faces 32, 52 support the operator when assembling the two parts to center the two parts and to correct any relative rotational offset of the two parts about their longitudinal axes such that in the final phase of the assembly process the wedge-shaped projections may slide into the associated notches in axial direction (parallel to the longitudinal axes) when the adapter tube is moved in axial direction to the fully inserted position in the socket.

As is also apparent from FIG. 7 the locking surfaces 50 of the adapter tube 40 and the locking surfaces 30 of the socket 2 are overlapping in axial direction of the adapter tube 40 over the entire axial extension of the notches of the locking surfaces 50 of the adapter tube.

The relationship of the locking surfaces 30 of the socket 2 with the locking surfaces 50 of the adapter tube 40 is further illustrated in FIGS. 8 and 9. FIG. 8 shows the hose connector assembly as in FIG. 7 in the connected state, wherein two planes B-B (FIG. 8A) and C-C (FIG. 8B) through the socket 2 in the upper end portion of the screw tube thereof are indicated. In the plane C-C there is no engagement between the locking surfaces 30 and 50, because blunted wedge-shaped projections (or the notches in-between them) of the locking surface 30 do not extend down to plane C-C. Therefore, one can see in the cross-section C-C the wedge-shaped projections of the locking surfaces 30 in cross-section, but the notches of the locking surfaces 50 are visibly in plan view because their axial extension does not reach down to plane C-C. In other words the cross-section C-C is take outside the region of axial overlap of the locking surfaces 30 and 50. On the other hand the cross-section B-B in FIG. 9A is taken in the axial overlap region of the locking surfaces 30 and 50, and the wedge-shaped projections or teeth of the locking surfaces 30 of the socket 2 are in engagement with the locking surfaces 50 (notches) of the adapter tube and both locking surfaces 30 and 50 are therefore visible as cut in cross-section B-B in FIG. 9A. In particular each notch between adjacent blunted wedge-shaped projections of the locking surfaces 50 is engaged by an apex of one of the wedge-shaped projections or teeth of the locking surfaces 30 of the socket.

As for example be seen in FIGS. 6 and 7 the locking surfaces 30 of the socket are located on the inner wall of the screw tube 4 such that the rotational locking is effected between the screw tube 4 and the adapter tube 4. As already indicated this allows to unscrew the nut 6 without causing any twisting of the hose fitted on the fir tree portion 44 of the adapter tube 40 since the adapter tube 40 remains rotationally locked in the screw tube 4. When the nut 6 has been unscrewed, the adapter tube 40 may be withdrawn from the screw tube 4 in axial direction for service and maintenance purposes. Adapter tube 40 and nut 6 after initial assembly always remain one unit.

The invention claimed is:

1. A hose connector assembly for connecting a hose to a port of a pressurized fluid system, the system comprising:
   a socket (2) and an adapter tube (40), both having a through-going passage (28, 48) in fluid communication with each other;
   the socket having end portions (4) with one end portion (4) being adapted to be connected to a port and having a receiving opening (8) as part of the passage (48) in the opposite end portion;
   wherein the adapter tube (40) has plug-in end portion (42) to be pushed into the receiving opening (8) which is adapted to cooperate with the plug-in end portion (42) of the adapter tube to form a plug-in connection mechanism;
   wherein the adapter tube (40) has, opposite to the plug-in end portion (42), a hose connector end fitting (44) adapted to be received in and hold a hose end portion placed thereon to thereby retain the hose;
   wherein the receiving opening (8) of the socket (2) and the plug-in end portion (42) of the adapter tube (40) are provided with complementary locking surfaces (30, 50) which engage each other when the plug-in end portion (42) of the adapter tube (40) is connected by the plug-in connection mechanism to the socket (2) to lock the adapter tube (40) with respect to the socket (2) against rotational movements about the longitudinal axis of the adapter tube (40) within the socket;
   wherein the socket (2) comprises a screw tube (4) and a nut (6) releasably connected to each other by a screw connection with the nut (6) disposed between the screw tube (4) and the adapter tube (40) when the adapter tube (40) is connected to the socket (2);
   wherein the receiving opening (8) extends through the entire nut (6) and into an adjoining part of the screw tube (4), the screw tube being externally threaded and being adapted to be screwed into an internal thread of the nut (6) at the end opposite to the receiving end of the receiving opening (8) formed in the nut (6), and that the locking surfaces (30) of the socket are located on the inner wall of the screw tube (4).

2. The hose connector assembly according to claim 1, wherein the locking surfaces (30) of the socket (2) are formed by a plurality of wedge-shaped projections which are circumferentially distributed around and projecting from the inner wall of the receiving opening of the socket (2), and that the locking surfaces (50) of the adapter tube (40) are formed by plurality of notches circumferentially distributed around the outer wall of an end portion of the plug-in end portion of the adapter tube (40), which wedge-shaped projections of the locking surfaces (30) of the socket (2) and which notches of the locking surfaces (50) of the adapter tube (40) are arranged complementary such that each notch of the locking surfaces (50) is engaged by a wedge-shaped projection of the locking surfaces (30) of the socket when the adapter tube (40) is in a fully inserted plugged-in state within socket (2).

3. The hose connector assembly according to claim 2, wherein the wedge-shaped projections (30) are provided with end faces (32) in axial direction that are chamfered, and that the facing axial end faces (52) of the locking surfaces (50) of the adapter tube (40) are chamfered in a complementary manner to the end faces (32) of the wedge-shaped projections such that, when the adapter tube (40) is inserted into the socket (2) the end faces (32) of the wedge-shaped projections and the axial end faces (52) of the locking surfaces (50) of the adapter tube come into abutment and slide along each other due their chamfered arrangement which causes a centering effect bringing the longitudinal axes of the adapter tube and of the socket into alignment and facilitating rotational alignment to bring the tips of the wedge-shaped projections (30) into alignment with the centers of the notches such the tips of the wedge-shaped projections slide into the notches when the adapter tube (40) is being fully inserted into the socket (2).

4. The hose connector assembly according to claim 1, wherein the plug-in connection mechanism includes a gripping ring (10) which is moveable in axial direction inside of the receiving opening (8) over a limited range and has an inwardly pointing sharp edge to come into contact with the outer surface of the adapter tube (40), wherein the gripping ring (10) is adapted to cooperate with a tapering circumferential wall portion (12) on the inner wall of the receiving opening (8) which tapers towards the receiving end of the receiving opening such that the gripping ring (10) is, by sliding along the tapering circumferential wall portion (12), gripping the adapter tube tighter the more a force attempting to pull out the adapter tube (40) is acting thereon.

5. The hose connector assembly according to claim 4, wherein the inner wall of the nut (6) comprises at least one circumferential groove in which a sealing ring (24) is received and is, closer to the receiving end of the receiving opening (8) than the sealing ring (24), provided with the tapering circumferential wall portion (12) tapering in the direction towards the receiving end of the receiving opening (8).

6. The hose connector assembly according to claim 5, wherein an end portion of the screw tube (4), opposite to a first external thread (16) on another end portion of the screw tube (4) for connection to the nut (6), is provided with a second external thread (14) adapted for screwing the screw tube (4) into an internal thread of a port, wherein the first and second external threads (14, 16) of the screw tube (4) are separated by a circumferential flange (18) in which, at the side facing in the direction of the second external thread (14) for connection to the port, a circumferential groove is formed in which a screw tube sealing ring (20) is received for sealing the screw tube (4) against the port when screw tube is connected thereto.

7. The hose connector assembly according to claim 5, wherein the circumferential groove in the inner wall of the nut (6) for receiving the sealing ring (24) is located, in axial direction of the nut (6), adjacent to the internally threaded portion of the nut (6) such that the end of the screw tube (4) contacts the sealing ring (24) when the screw tube (4) is fully screwed into the nut (6), and that the tapering circumferential wall portion (12) is formed on the inner wall of the interior of the receiving opening (8) in the nut (6) closer to the receiving end of the receiving opening than the circumferential groove with the sealing ring (24).

8. The hose connector assembly according to claim 1, wherein following a tapering circumferential wall portion (12) in the interior of the receiving opening (8) in the direction towards the receiving end of the receiving opening, a circumferential groove is formed in which an environmental seal (26) is received for sealing the interior of the receiving opening when the adapter tube (40) is plugged-in state therein.

9. The hose connector assembly according to claim 8, wherein the plug-in end portion (42) of the adapter tube is provided with a peripheral recess portion (43) having a smaller outer diameter than adjacent cylindrical portions of the plug-in end portion, which peripheral recess portion (43) is arranged on the plug-in end portion (42) in axial region thereof such that, when the plug-in end portion (42) is inserted into the socket (2) but has not reached the fully inserted position, the environmental seal (26) is located in the region of the peripheral recess portion (43) such that, when pressurized air is applied to the hose connector assembly, pressurized air is leaking through the peripheral recess portion and past the environmental seal (26).

10. The hose connector assembly according to claim 9, wherein the plug-in end portion (42) is provided with a reduced diameter outer end portion including the locking surfaces (50) which has a reduced outer diameter compared to the adjacent cylindrical portion adjacent to the peripheral recess portion (43), wherein this reduced diameter outer end portion is located in an axial region of the plug-in end portion (42) such that, when the plug-in end portion (42) has not reached a fully inserted position in the socket, the sealing ring (24) of the socket is disposed in the region of the reduced diameter outer end portion such that pressurized air applied to the hose connector assembly is able to pass by the sealing ring (24) and through the peripheral recess portion (43).

11. The hose connector assembly according to claim 9, wherein the peripheral recess portion (43) and the adjacent cylindrical portions are arranged in axial direction on the plug-in end portion such that, when the plug-in end portion is fully inserted in the receiving opening of the socket, one cylindrical portion abuts the environmental seal (26) and the other cylindrical portion abuts the sealing ring (24).

12. The hose connector assembly according to claim 1, wherein the screw tube (4) and the nut (6) are adapted such that the end face of the nut (6) surrounding the end of the passageway opposite to the receiving opening comes into abutment on a side surface of a flange (18) of the screw tube (4), and that a circumferential groove with a nut sealing ring (22) is provided in the abutment area of the end face of the nut (6) on the flange of the screw tube (4) to seal the connection between screw tube (4) and nut (6) when the nut is completely screwed onto the screw tube.

13. The hose connector assembly according to claim 1, wherein the hose connector end fitting (44) of the adapter tube (40) is formed as a barbed connector to be received in an end portion of the hose to hold the hose end portion under tension thereon.

14. The hose connector assembly according to claim 1, wherein between the plug-in end portion (42) and the hose connector end fitting (44) of the adapter tube (40) a bent intermediate portion is formed such that the hose connection end fitting (44) has an axial direction that is inclined with respect to the axial direction of the plug-in end portion (42).

\* \* \* \* \*